United States Patent Office 2,957,888
Patented Oct. 25, 1960

2,957,888
NEW POLYHYDROPHENANTHRENE COMPOUNDS AND PROCESS FOR THEIR MANUFACTURE

Albert Wettstein and Karl Heusler, Basel, Helmut Ueberwasser, Riehen, and Peter Wieland, Basel, Switzerland, assignors to Ciba Pharmaceutical Products Inc., Summit, N.J.

No Drawing. Filed Jan. 16, 1958, Ser. No. 709,214
Claims priority, application Switzerland Jan. 25, 1957
9 Claims. (Cl. 260—340.9)

This invention relates to the manufacture of new polyhydrophenanthrenes.

More particularly the invention concerns compounds of the formula

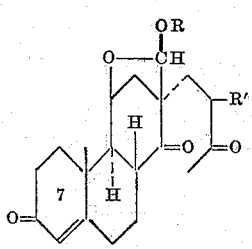

and their 7-ketals and 7-enol ethers, R in the above formula indicating a hydrogen atom or an alkyl or acyl group and R' a hydrogen atom or a methyl group, and a process for the manufacture thereof.

The new compounds are important intermediate products for the manufacture of the highly active suprarenal cortex hormone aldosterone. Further conversion of the products of this process can be carried out by known methods (cf. Journ. Amer. Chem. Soc., vol. 78, pages 501–502 (1956), and vol. 76, pages 5014–5016 (1954)), being illustrated by way of example by the following scheme of formulae:

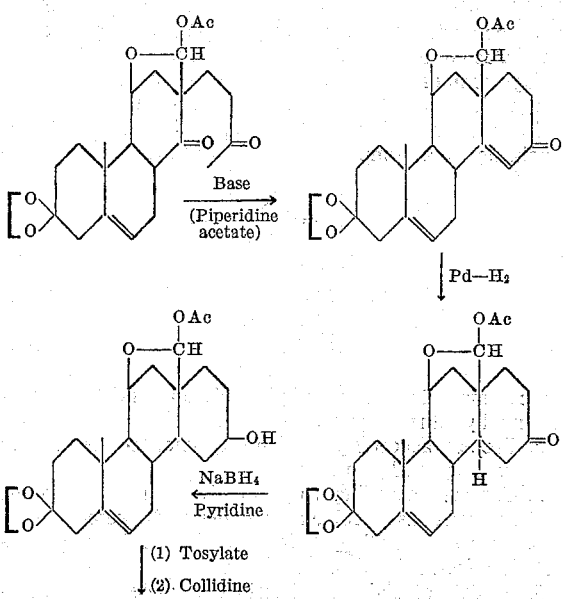

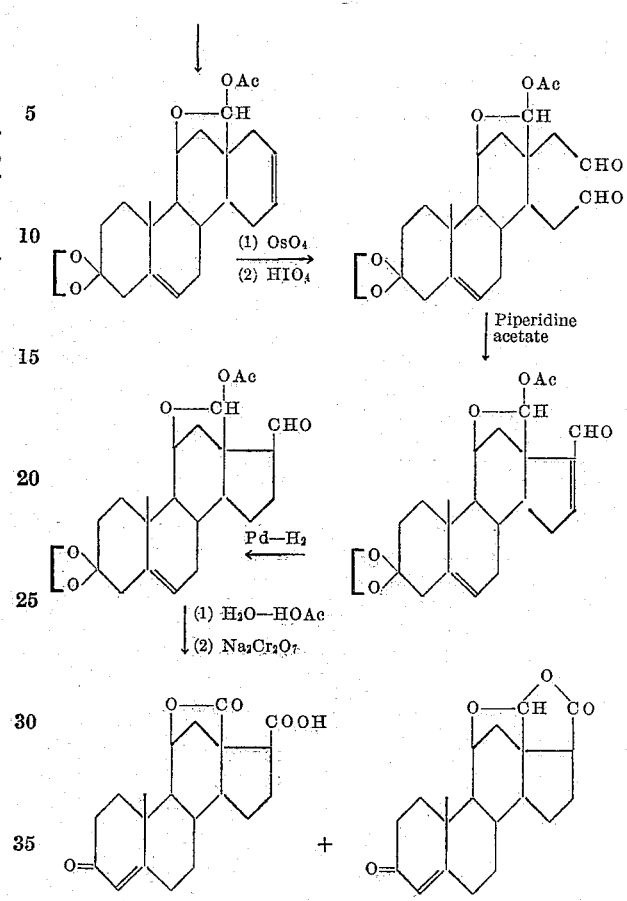

The resulting etio-acid can be converted into aldosterone by forming a carboxylic acid halide, treating such halide with a solution containing an excess of diazomethane, treating the diazoketone thus formed with an aqueous or anhydrous acid and saponifying any esterified group present and reduction of the lactone to the semiacetal grouping. This process is described and claimed in copending application Serial No. 480,061, filed January 5, 1955, now Patent No. 2,904,545, and Serial No. 585,168, filed May 16, 1956, now abandoned, by Tadeus Reichstein et al.

The process of the invention consists in adding methyl vinyl ketone or methyl isopropenyl ketone to a compound of the formula

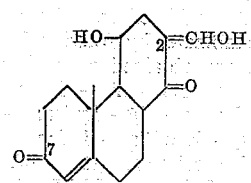

or a 7-ketal thereof, for example the ethylene ketal, or a 7-enol ether thereof, for example the ethyl enol ether, in the presence of an organic base, for example a di- or trialkylamine, such as trimethylamine or triethylamine, the reaction being conducted in a moist medium, and, if desired, treating the resulting condensation compounds with an esterifying or etherifying agent.

It is important to add the unsaturated aliphatic ketone to the starting material in a moist medium since it was observed that the attachment of the substituent in 2-position from the α-side only takes place in the presence of water. In an anhydrous medium on the other hand the new substituent becomes attached from the β-side and isomeric addition products are produced which are unsuitable for the synthesis of aldosterone.

The addition reaction of the present invention takes place with advantage in a solvent miscible with water, such as dioxane, tetrahydrofurane, dimethyl formamide, acetone or low alcohols, for example tertiary butanol or ethyl alcohol: It can however also be carried out in a two-phase system, for example in ether-dioxane-water mixtures. The unsaturated ketone to be added on is used in excess, advantageously 1.2–10 mol thereof being used per mol of the other reactant. Generally, in the case of the amine catalytic quantities suffice; equimolecular or even larger quantities can, however, be used. The reaction is advantageously carried out at room temperature and in that case requires reaction times varying from 3 hours to several days. The reaction velocity depends to a far reaching extent on the amine concentration. In the case of higher amine concentrations, however, the stability of the addition product is reduced, the formyl group tending to be split off. The addition of a stabilizer, for example hydroquinone, for the prevention of the polymerization of the vinyl or isopropenyl ketone, is of advantage.

The condensation products which contain a semi-acetal grouping may, if desired, be treated with an esterifying or an etherifying agent, such as carboxylic acid anhydrides or halides, or with alcohols or thioalcohols, in the presence of suitable esterifying or etherifying catalysts. As esterifying agents there are preferably used anhydrides of lower fatty acids, such as acetic acid anhydride in the presence of basic esterifying agents, such as tertiary organic bases, for instance pyridine. As etherifying agents there come into consideration especially lower aliphatic or araliphatic alcohols, such as benzyl alcohol, or triphenylcarbinol, orthoformic acid esters and also dihydropyran, in the presence of acidic etherifying agents, such as iron chloride, boron trifluoride, zinc chloride or pyridine hydrochloride. There are always formed the derivatives of the semiacetal. In no case could a free aldehyde group be observed in the final product.

The following example illustrates the invention:

*Example*

1.6 grams of d:1 - Δ$^{8a}$ - 1 - oxo - 2 - hydroxy - methylene - 4β - hydroxy - 4bβ - methyl - 7 - ethylenedioxy-4aα:10aβ - dodecahydrophenanthrene are suspended in a mixture of 8 cc. of dioxane, 2 cc. of water and 2 cc. of methylvinyl ketone. After the addition of 2 cc. of a 10% triethylamine-dioxane solution, at 23–25° C., a clear solution is produced in the course of 4 minutes. The whole is allowed to stand at room temperature for 3 days. The reaction mixture is then freed from volatile constituents under vacuum followed by high vacuum and the residue is treated with ether. From the difficultly soluble crude crystallizate, by fractional crystallization from alcohol, there are obtained as first fraction 300 mg. of the semi-acetal of d:1 - Δ$^{8a}$ - 1 - oxo - 2α - (γ - oxobutyl) - 2β - formyl - 4β - hydroxy - 4bβ - methyl - 7-ethylene - dioxy - 4aα:10aβ - dodecahydro - phenanthrene in the form of colorless leaflets of M.P. 168–173° C. A second fraction of 170 mg. of M.P. 158–162° C. deposited in extremely similar crystals, is shown to be the d:l-Δ$^{8a}$ - 1 - oxo - 2 - (γ - oxo - butyl) - 4β - hydroxy - 4bβ-methyl - 7 - ethylenedioxy - 4aα:10aβ - dodecahydrophenanthrene produced by splitting off the formyl group. From the mother liquors of the spontaneously crystallizing products, by chromatography on a column prepared from a mixture of 25 grams each of active charcoal containing very little iron, and cellulose powder and elution with acetone, a further 180 mg. of the above semi-acetal can be produced. The compound, which also exists as semi-acetal in methylene chloride solution, in the infrared spectrum exhibits the following bands: 2.78μ and 2.96μ (OH and OH associated), 5.83mμ (ketones).

By replacing in the above example the methyl vinylketone by freshly distilled methyl isopropenyl ketone, there is obtained in a completely analogous manner the semi-acetal of d:1 - Δ$^{8a}$ - 1 - oxo - 2α - (β - methyl - γ-oxo - butyl) - 2β - formyl - 4β - hydroxy - 4bβ - methyl-7 - ethylenedioxy - 4aα:10aβ - dodecahydrophenanthrene.

A solution of 230 mg. of the semi-acetal of d:l - Δ$^{8a}$-1 - oxo - 2α - (γ - oxo - butyl) - 2β - formyl - 4β - hydroxy - 4bβ - methyl - 7 - ethylenedioxy - 4aα:10aβ - dodecahydrophenanthrene in 5 cc. of pyridine and 3.4 cc. of acetic anhydride is left overnight at room temperature. The residue from the solution after evaporation under a water pump vacuum is freed from residues of the acetylation mixture by addition of xylene and evaporation under a water pump vacuum carried out three successive times. The resulting semi-acetal acetate crystallizes from acetone-methanol in compact needles of M.P. 170.5 to 172.5° C. In the infra-red spectrum in methylene chloride solution, among others the following characteristic bands are present: 5.73μ (acetate), 5.83μ (6-ring ketone, methyl ketone), 8.15μ (acetate) and 8.6μ (methyl ketone), whereas a hydroxyl band and an aldehyde band at about 3.6–3.7μ are lacking.

What is claimed is:

1. Process for the manufacture of new polyhydrophenanthrene compounds of the formula:

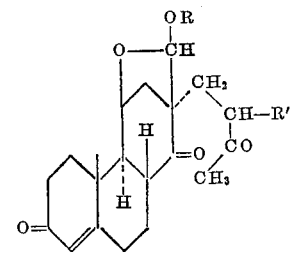

in which formula R represents a member selected from the group consisting of a hydrogen atom, a lower alkyl group, a lower alkylcarbonyl group and R' represents a member selected from the group consisting of a hydrogen atom and a methyl group, the corresponding lower alkylene 7-ketal and the 7-enol lower alkyl ether thereof which comprises reacting, in the presence of an organic base selected from the group consisting of dialkyl and trialkyl amines, a member of the group consisting of methyl-vinyl ketone and methylisopropenyl ketone in a moist medium with a member selected from the group consisting of a compound of the formula

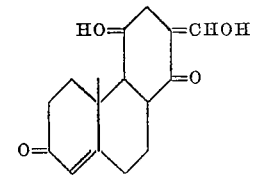

the corresponding lower alkylene 7-ketal and the 7-enol lower alkyl ether thereof.

2. Process according to claim 1, wherein the organic base used is triethyl amine.

3. Process according to claim 1, wherein the moist medium contains a solvent miscible with water.

4. Process according to claim 1, wherein the condensation is effected in aqueous dioxane.

5. Process of claim 1, wherein the condensation compound obtained is reacted with a lower fatty acid anhydride in the presence of a tertiary organic base.

6. A member selected from the group consisting of a compound of the formula

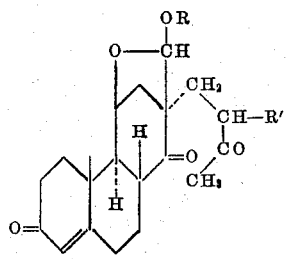

in which formula R represents a member selected from the group consisting of a hydrogen atom, a lower alkyl group, a lower alkylcarbonyl group and R' represents a member selected from the group consisting of a hydrogen atom and a methyl group, the corresponding lower alkylene 7-ketal and the 7-enol lower alkyl ether thereof.

7. The semiacetal of $\Delta^{8a}$ - 1 - oxo - 2$\alpha$ - ($\gamma$ - oxobutyl) - 2$\beta$ - formyl - 4$\beta$ - hydroxy - 4b$\beta$ - methyl - 7-ethylenedioxy - 4a$\alpha$,10a$\beta$ - dodecahydrophenanthrene.

8. The semiacetal of $\Delta^{8a}$ - 1 - oxo - 2$\alpha$ - ($\beta$ - methyl-$\gamma$ - oxo - butyl) - 2$\beta$ - formyl - 4$\beta$ - hydroxy - 4b$\beta$-methyl - 7 - ethylenedioxy - 4a$\alpha$,10a$\beta$ - dodecahydrophenanthrene.

9. The semiacetal acetate of the compound of claim 7.

References Cited in the file of this patent
UNITED STATES PATENTS 2,846,445  Raffelson _____ Aug. 5, 1958

OTHER REFERENCES

Fieser et al.: Organic Chemistry, 3rd ed., Reinhold Publishing Corporation, New York (1956), pp. 704–705.

Schmidlin et al.: Experientia, vol. 11, pp. 365–368 (1955).

I. D. Webb et al.: J. Am. Chem. Soc., vol. 73, pp. 752–753 (1951).